United States Patent [19]

Muraoka

[11] 3,751,598

[45] Aug. 7, 1973

[54] MAGNETIC RECORD-PLAYBACK DEVICE

[76] Inventor: Shigetaro Muraoka, 2-28 Osaki 2-chome Shin, Tokyo, Japan

[22] Filed: Aug. 12, 1971

[21] Appl. No.: 171,085

[30] Foreign Application Priority Data

Jan. 27, 1971 Japan ......... 46/2838 (utility model)

[52] U.S. Cl. .................................... 179/100. MD 179/100.2 S, 179/100.2 A, 179/100.2 RE

[51] Int. Cl.... G11b 5/82, G11b 23/18, G11b 23/32

[58] Field of Search .......... 179/100.2 A, 100.2 MD, 179/100.2 RE, 100.2 S

[56] References Cited

UNITED STATES PATENTS 3,409,745 11/1968 Kock ........................ 179/100.2 MD

*Primary Examiner*—Raymond F. Cardillo, Jr.
*Attorney*—Lawrence I. Lerner, Sidney David et al.

[57] ABSTRACT

A magnetic record-playback device consisting of a disk having magnetic recording medium on the periphery thereof and having one or more of apertures; a magnetic record-playback head; a main switch; a sub-switch; a driving system for said disk and other ordinary record-playback means including amplifier etc., and being characterized in that the rotation of said disk being started by the action of said sub-switch and stopped by the opening of said main switch where a contact of said main switch being dropped into one of said apertures.

1 Claim, 7 Drawing Figures

MAGNETIC RECORD-PLAYBACK DEVICE

The present invention relates to a magnetic record-playback device, more particularly the invention relates to the device which is especially suited for recording and reproducing a short sound or a voice repeatedly.

Further, the present invention relates to a magnetic record-playback device which is highly advanced in construction and produces true high fidelity recording and reproduction.

Still further, the invention relates to a magnetic record-playback device in which the starting and stopping of the recording or reproducing is very accurate, and after a certain period of the operation, the device is stopped automatically, at the same time, the device is ready for the next cycle of operation.

In the conventional practice, an endless recording tape is used to reproduce repeatedly the record of sounds such as breif comments, commercial catch phrases etc. Especially in case that such records are short ones, it is difficult to find the starting points of the tapes, therefore the playback of the tape is liable to omit the initial portion of the tape or to run over into the next cycle. Accordingly, in order to prevent these misoperation, it is necessary to use an expensive apparatus having complicated mechanisms.

Further, in case of the apparatus in which the magnetic tape being stretched around a rotating cylinder, the contact between the face of playback head and the surface of magnetic tape is not satisfactory, therefore the reproduction of the original sound is not effective.

In accordance with the device of the present invention, the above described defects and difficulties can be solved.

Therefore, an object of the present invention is to provide a magnetic record-playback device which is suitable for use of recording and reproducing of a relatively short sound.

Another object of the invention is to provide a magnetic record-playback device by which a correct starting or stopping of the operation can be carried out without any troublesome manipulations.

A further object of the invention is to provide a magnetic record-playback device by which a reproduction of sound with minimum variation from the original can be obtained.

Accordingly, the device of the present invention can be used for several services such as:

the insertion of a commercial catch phrase in broadcasting in which a severe time schedule is required;

the reproduction of a commercial catch phrase, an explanation etc. by fitting the device in an advertisement figure, a poster pillar or other display materials;

the delivery of an anouncement by interlocking with the door switch or other accessories; and the reproduction of a voice, a chirping, a signal, instructions etc. by fitting in a toy or a game.

These and other objects and features of this invention will be better understood upon consideration of the following detailed description and the accompanying drawings in which.

Figures 1, 2:
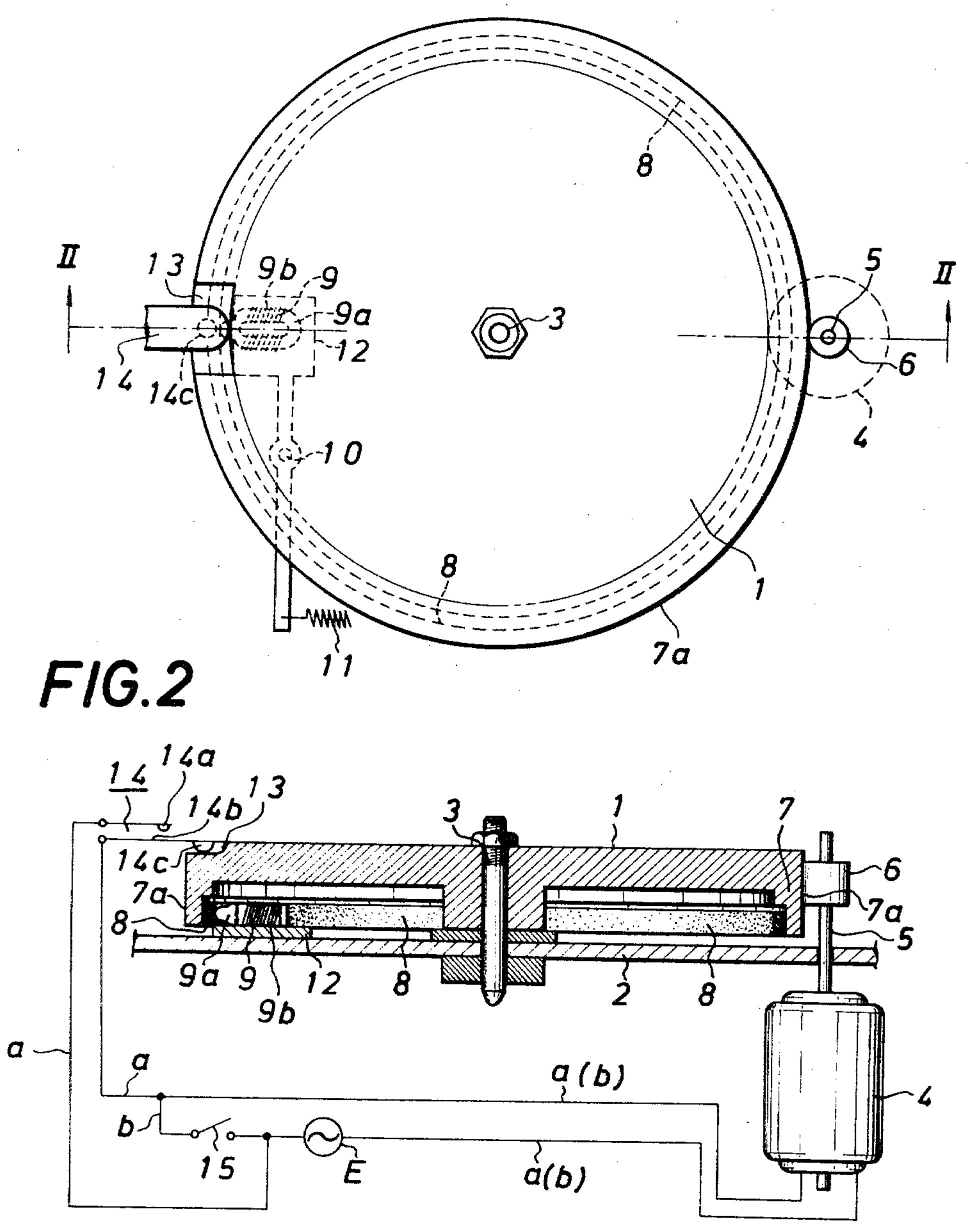
FIG. 1 is a plan view of the first embodiment of this invention including a recording disk, a record-playback head and a driving system.
FIG. 2 is a cross sectional elevation of the first embodiment taken along the line II-II in FIG. 1 including an electrical circuit.

Referring now to FIGS. 1 and 2, the numeral 1 indicates a rotating disk for the recording and reproducing, which is made of non-magnetic material such as synthetic plastics or aluminium, and said disk 1 is held rotatably by a shaft 3 onto a frame 2 of an appropriate casing. A rubber pressure roller 6 on a driving shaft 5 is held against the outer surface 7*a* of the peripheral portion 7 of said disk 1, and said pressure roller 6 is actuated by an electric motor 4 to provide torque for the disk 1 during recording or reproducing the sound. The numeral 8 is a recording tape, or in place of the tape, a sheet which is applied with a magnetic medium, for example iron oxide particles, is used. The tape or sheet 8 is applied in a groove on the inside surface of said peripheral portion 7 of the disk, with using appropriate adhesive. This tape or sheet 8 is hereinafter referred to as "recording medium". The numeral 9 is a combined record-playback head which is switched to either function according to the mode of operation, and is made by winding a coil 9*b* on a core 9*a*. The separate type heads, i.e., a recording head and a playback head can be installed if required in place of said combined head. Further, the erase head for the recording is not indicated in the drawing, however it may be fixed appropriately to remove the magnetism from the recording medium before the medium coming to the recording head, which will be practicable in accordance with the ordinary art. The head 9 is supported by an arm plate 12 which is swingably held by a shaft 10 and a coil spring 11. Thereby, the face of the head 9 is softly pushed against the recording surface of said recording medium 8.

Further, the periphery of the upper surface of the disk 1 is provided with a notch 13. The numeral 14 is a main switch for the motor 4, being attached upon said notch 13 and consisting of a stationary point of contact 14*a*, a contact arm 14*b* and a movable contact 14*c*. During the rotation of the disk 1, the contact 14*c* is supported on the peripheral surface of the disk 1, thus the arm 14*b* is pushed up and the contact 14*a* is in touch with the arm 14*b*. Thereby, the circuit *a* is closed, in the meantime as the disk 1 turns, the notch 13 of the disk comes to the position of the main switch 14, the contact 14c drops into the notch 13 to break the circuit *a* of the motor 4. Thereupon sub-switch 15 which is parallel to said main switch 14 is incorporated into said circuit to form a circuit *b*, which is in series with the motor 4 and the power source E (FIG. 2). In case of this device being installed into a casing, said sub-switch 15 can be operated from the outer side of the casing by any actions desired such as touching a button, interlocking with other actions or automatic intermittent control. As explained in the above, the one cycle of the operation is completed by switching off the main switch 14, in which the contact 14*c* is received in the notch 13 of the disk 1. Therefore, in order to drive the disk 1 again, the electric current is to be applied to the motor 4 by some measures, which is the reason for the employment of the sub-switch 15, and by closing said sub-switch 15, the disk 1 can be driven again, at the same time, the contact 14*c* climbs out said notch 13 to close the main circuit *a* to continue the rotation of the disk 1 until the notch 13 comes again to the contact 14*c* of the main switch 14. Accordingly, the sub-switch 15 serves for starting the rotation of the disk only, therefore after the start, the sub-switch 15 can be released. In this way, the start and the stop of recording or reproducing can be controlled precisely and automatically. If a previously recorded medium is used for this device for the purpose of repeated reproduction of a sound, both ends of the recorded medium must be coincided with the position of said notch 13.

Figure 3:
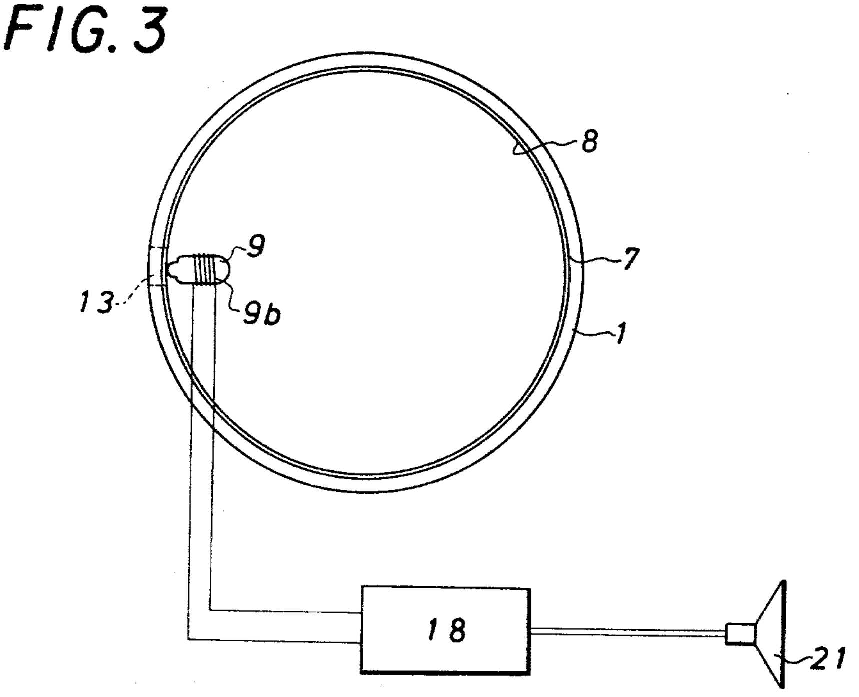
FIG. 3 is a schematic illustration of the connections among the recording disk, the record-playback head, the amplifier and the loud-speaker.

As shown in FIG. 3, in reproduction of the sound, the magnetized medium 8 is passed over the record-playback head 9 (now functioning as a playback head) or over a separate playback head, with the coil 9*b* in the head connected to an amplifier 18 and a loud speaker 21. The magnetization of the tape induces electrical currents in the coil 9*b* which are then amplified and reproduced and recreating the original sound.

Figure 4:
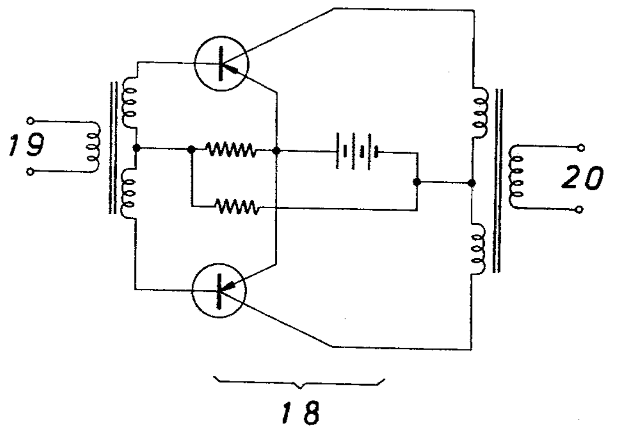
FIG. 4 is an electric circuit of an exemplar amplifier.

An exemplar circuit of an amplifier is shown in FIG. 4, however, the amplifier of the device of this invention is not restricted to this amplifier. The numeral 19 is input and the numeral 20 is the output of the amplifier 18. The amplifier is p-n-p push-pull type using transistors, however, any type of the amplifier may be used in accordance with the requirement in the practical use.

The function of the device of this invention will be explained in the following.

The device is interlocked with, for example, the opening of a door, the sub-switch 15 is operated by the action of a door switch, thereby a passenger passing through the door, the subswitch 15 is closed by the action of the door switch, then the rotation of the disk 1 is started and the recorded voice is reproduced for the passenger, and after a certain period of time, the reproduction of the recorded sound is stopped automatically. In another case, for example, the device of the invention can be built in a display figure for advertisement, and the figure is made so as to close the sub-switch 15 when a portion of the figure is touched by someone or when another appropriate button switch is pushed. Further the device of this invention can be fixed in a game machine wherein the sub-switch 15 is closed, for example, when a ball is dropped in a hole in the game, to produce a certain signal or other indications. The sub-switch 15 may be closed by any other ways in accordance with the status of usage, and the disk 1 is rotated by the rotation of the motor 4 through the pressure roller 6. The contact 14*c* in the notch 13 then comes out to close the main switch 14, thereby the rotation of the disk 1 is continued until the contact 14*c* drops into the notch 13 again, and the rotation of the disk 1 is stopped. If a plurality of the notches 13 are provided on the periphery of the disk 1, several unit records can be recorded and reproduced. In the reproduction of the record, the magnetized medium 8 of the disk 1 is passed over the record-playback head 9 to induce electrical currents in the coil 9*b* in proportion to the strength of the magnetism of the recording medium 8, the electrical current of which is then amplified by the amplifier 18 and the sound is produced through the loud speaker 21.

In case of the device of the invention being used for recording a sound, an erase head, a recording head, a microphone, a recording amplifier may be used for the device in accordance with the ordinary art, in which some of them can be used for both of recording and reproducing.

In the following, another embodiment of the invention will be explained in accordance with FIGS. 5 to 7, inclusive. The disk 1 of the second embodiment is provided with a recording medium 8 where a cushion 22 is interposed between them, and the disk 1 is provided with a plurality of apertures 23 – 29 which serve as the notch 13 as disclosed in the former embodiment. That is, in the rotation of the disk 1, the end of the contact 14*c* drops into one of the apertures to switch off the electric current for the motor 4. The apertures are provided separately on a plurality of concentric circular tracks 30 – 33, thereby any of desired short records can be recorded continually.

Figures 5, 6, 7:
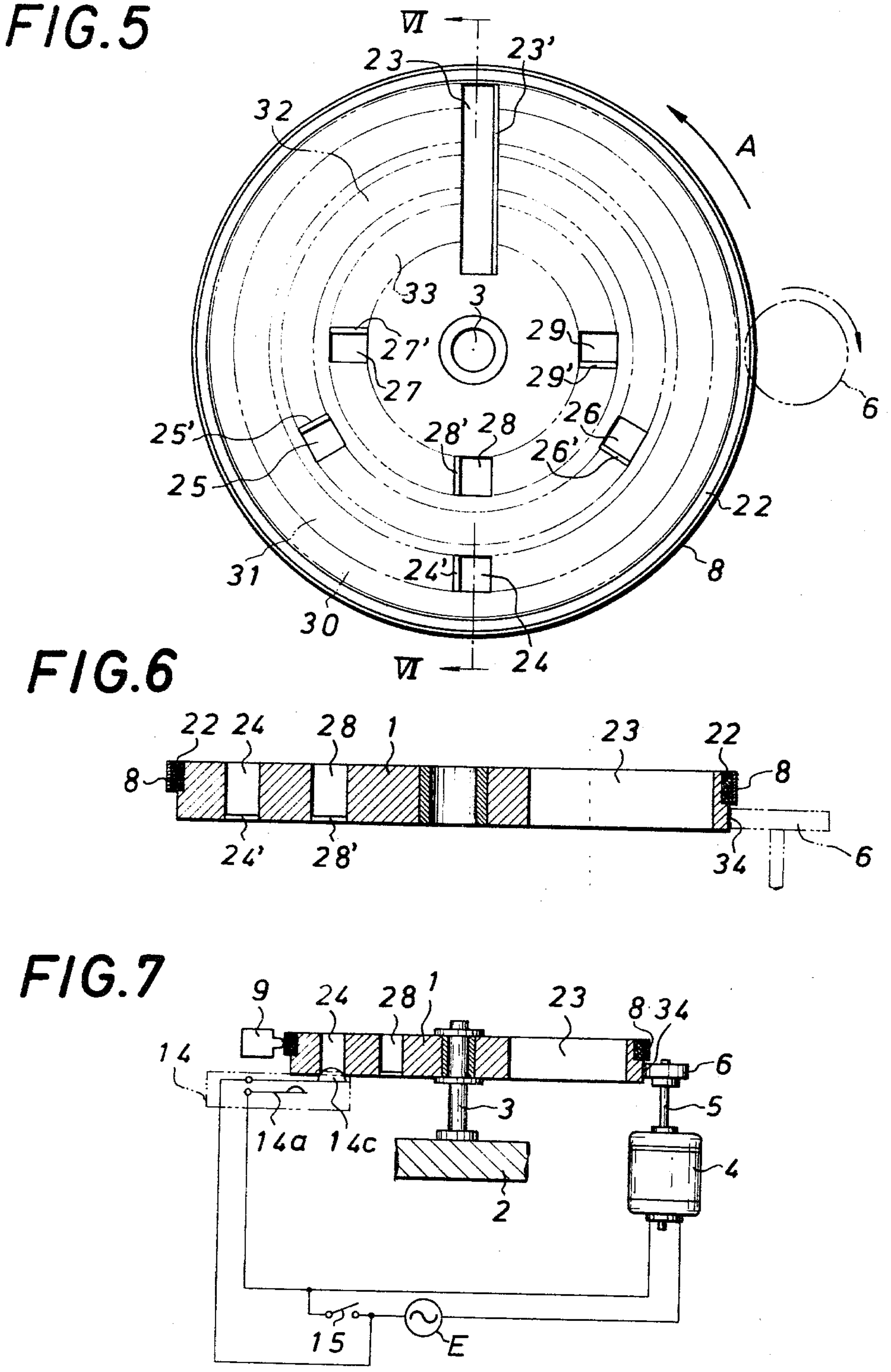
FIG. 5 is a plan view of the disk of the second embodiment of the invention.
FIG. 6 is a cross sectional elevation of the disk taken along the line VI—VI in FIG. 5.
FIG. 7 is a cross sectional elevation of the disk in use as shown in FIGS. 5 and 6 including the electric circuit.

In FIG. 5, the disk 1 is made of proper non-magnetic material such as synthetic plastics, aluminium etc. which serves in the same manner as the disk in the former embodiment. The disk 1 is provided with a recording medium 8 also in the same manner as in the former embodiment where the difference is that a cushion material 22 is interposed between the outer periphery of the disk 1 and said recording medium 8. The cushion 22 may be of cushion material or elastic material such as rubber, felt, rubber sponge or foamed synthetic plastics and the outer side surface of the disk 1, the cushion material 22 and the recording medium 8 are adhered together with a proper adhesive material.

The surface of the disk 1 is provided with a common aperture 23 and with a plurality of other apertures 24, 25, 26, 27, 28 and 29 to receive the tip of the contact 14*c*. These apertures are aligned on four tracks 30, 31, 32 and 33, in which said tracks are used for one rotation, half rotations, third rotations and quarter rotations. The track 30 for one rotation is provided with said common aperture 23 only, the track 31 for half rotations is provided with the common aperture 23 and another aperture 24, the track 32 for third rotations is provided with the common aperture 23 and the two other apertures 25 and 26 with 120° intervals, and the track 33 for quarter rotations is provided with four apertures 23, 27, 28 and 29 with 90° intervals. The switch 14 is made such that the position of the tip of contact 14*c* can be controlled on any of the tracks 30 – 33 in accordance with the requirement in the practical use. In case three different records are necessary, the contact 14*c* of the switch 14 is positioned on the track 32, thereby the rotations of the disk 1 can be started and stopped automatically at the apertures 23, 25 and 26 in the recording or reproducing step by dropping the tip of the contact 14c into one of the apertures. On the rear sides of said apertures, inclinations (acclivities) 23′, 24′, 25′, 26′, 27′, 28′ and 29′ are provided which serve as lift slopes for the tip of the contact 14*c* when the disk starts to rotate by the action of the sub-swith 15.

The principle of the operation of the device of this embodiment is just the same as that of the former embodiment. The apertures can be varied in number in accordance with the requirement of the use.

Referring now to FIG. 7, in like manner as those in the former embodiment, the disk 1 is rotatably held by a shaft 3 which is attached to the frame 2, and the disk 1 is driven by the motor 4 in which a pressure roller 6 on the driving shaft 5 is pushed to the outer peripheral side surface 34 of the disk 1. A magnetic record-playback head 9 is held against the outer surface of the recording medium 8, which is connected electrically to the amplifier etc. (not shown). The main switch 14 consists of contacts 14*a* and 14*c*, the latter of which is used for the stopping of the disk 1 in the operation, that is, in the rotation of the disk 1, the tip of the contact 14*c* is dropped into one of the apertures to switch off the electrical circuit for the motor 4. The device is also provided with a sub-switch 15 and an electric power source E and they are connected with each other in like manner as those in the former embodiment.

In this embodiment having the above described construction, an ideal contact between the magnetic head 9 and the surface of the recording medium 8 can be expected as the cushion material 22 being interposed therebetween. In operation, when the motor 4 is started by the action of the sub-switch 15, the pressure roller 6, accordingly the disk 1 is rotated, and the contact 14c of the main switch 14 climbs up one of the inclinations 23' – 29' to close the main switch 14, thereafter the rotation of the disk 1 is continued for a given period of time until the contact 14*c* drops into the next aperture even when the sub-switch 15 is released. The position of the main switch 14 can be changed to any one of the tracks 30 – 33, and if two kinds of sounds are to be recorded, the switch 14 is selected so as to come on the track 24. Therefore, in accordance with the lengths and number of the unit records, the track for the main switch cab be selected to one rotation, half rotations, third rotations and quarter rotations of the disk. Though being not shown in the above about the switches for the amplifier etc., the device amy be optionally furnished with them to supply electric current interconnectedly with the switch means of the disk 1 or continuously, and the disk 1 may also be applied with a brake upon the switching off of the main switch 14, and further the disk can be driven, without saying, by belt drive means or other mechanical driving means.

As explained in the above, the record-playback device of the present invention is convenient for recording and repeated reproducing of short unit records, and having a simple construction, the durability thereof is superior as compared with the ordinary ones. In addition to that, the device of the invention is low in the production costs, simple in operation and very high in the performance.

It shoud be emphasized that the specific embodiments described and shown herein are intended as merely illustrative and in no way restrictive of the invention.

What is claimed is:

1. A magnetic record-playback device which consists of:

a disc having a cushion material mounted on the periphery thereof and a magnetic recording medium mounted on said cushion material;

said disc having one or more apertures therein;

a magnetic record-playback head mounted for elestically contacting said magnetic recording medium;

means including an electric motor for rotating said disc;

a normally opened main switch being mounted adjacent to and held closed by said disc for opening when a portion thereof contacts one of said apertures;

said main switch being connected to energize said motor when closed;

a normally opened sub-switch being connected in parallel with said main switch;

said apertures being disposed on a plurality of concentric tracks;

said device further configured so that N apertures are on one of said tracks and are positioned at 360°/N intervals thereon;

N being a natural number from 1 to 10; in which N apertures are arranged on two or more of said tracks and N is different for

* * * * *